(12) United States Patent
Christensen et al.

(10) Patent No.: US 6,367,361 B1
(45) Date of Patent: *Apr. 9, 2002

(54) METHOD AND APPARATUS FOR TRIMMING THERMOFORMED FILMS

(75) Inventors: Jeffrey K. Christensen, Caledonia; Dale Moore, Plymouth; Zinoviy Chernyak, Farmington Hills, all of MI (US)

(73) Assignee: Ford Motor Company, Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,366

(22) Filed: Jul. 30, 1997

(51) Int. Cl.$^7$ ................................................. B26D 7/10
(52) U.S. Cl. ............................. 83/15; 83/170; 83/914; 264/163
(58) Field of Search ........................... 83/15, 170, 914; 264/163

(56) References Cited

U.S. PATENT DOCUMENTS

| | | | |
|---|---|---|---|
| 3,668,034 A | | 6/1972 | Nicholas et al. |
| 4,273,738 A | * | 6/1981 | Spengler ..................... 264/154 |
| 4,405,537 A | | 9/1983 | Spengler ..................... 264/45.4 |
| 4,650,533 A | | 3/1987 | Parker et al. |
| 4,755,129 A | * | 7/1988 | Baker et al. ................. 425/292 |
| 4,769,100 A | | 9/1988 | Short et al. |
| 4,902,557 A | | 2/1990 | Rohrbacher |
| 4,913,760 A | | 4/1990 | Benson et al. |
| 4,976,896 A | | 12/1990 | Short et al. |
| 4,991,478 A | | 2/1991 | Riley ............................. 83/49 |
| 5,034,077 A | | 7/1991 | Pata |
| 5,034,269 A | | 7/1991 | Wheeler |
| 5,037,680 A | | 8/1991 | Papendick et al. |
| 5,055,346 A | | 10/1991 | Rohrbacher |
| 5,114,789 A | | 5/1992 | Reafler |
| 5,125,994 A | | 6/1992 | Harasta et al. |
| 5,182,065 A | * | 1/1993 | Piotrowski et al. ..... 264/163 X |
| 5,188,787 A | * | 2/1993 | King et al. ............. 264/163 X |
| 5,192,609 A | | 3/1993 | Carroll, Jr. |
| 5,196,152 A | * | 3/1993 | Gamache et al. ........... 264/163 |
| 5,208,081 A | | 5/1993 | Gübitz et al. |
| 5,215,811 A | | 6/1993 | Reafler et al. |
| 5,215,826 A | | 6/1993 | Shimanski et al. |
| 5,248,364 A | | 9/1993 | Liu et al. |
| 5,271,352 A | | 12/1993 | Wilson |
| 5,342,666 A | | 8/1994 | Ellison et al. |
| 5,350,473 A | | 9/1994 | Weder et al. |
| 5,393,474 A | * | 2/1995 | Souders ....................... 264/163 |
| 5,435,865 A | | 7/1995 | Lee et al. |
| 5,514,427 A | | 5/1996 | Ellison et al. |
| 5,536,539 A | | 7/1996 | Ellison et al. |
| 5,538,576 A | | 7/1996 | Knop et al. |
| 5,565,053 A | * | 10/1996 | Happich ...................... 156/216 |
| 5,585,187 A | | 12/1996 | Shinonaga et al. |
| 5,599,608 A | | 2/1997 | Yamamoto |

FOREIGN PATENT DOCUMENTS

| | | | | |
|---|---|---|---|---|
| EP | 0 095 121 A2 | 5/1983 | ........... | B29D/11/00 |
| GB | 2 195 940 A | 4/1988 | ........... | B29C/43/40 |

* cited by examiner

*Primary Examiner*—M. Rachuba
(74) *Attorney, Agent, or Firm*—MacMillan, Sobanski & Todd, LLC

(57) ABSTRACT

A method and apparatus of trimming a thermoformed film comprising the following steps. A Thermoplastic flexible film is placed within a frame. The film and frame are heated sufficiently to make the film pliable. The film and frame are moved to a position adjacent a forming mandrel. The forming mandrel is moved against the film and causes the film to conform to the shape of the mandrel. After the film has fully conformed to the shape of the mandrel, the mandrel and film are moved to a trimming station. Knives on the trimming station contact and cut the film. It is also desirable that the knives be mounted on actuators to move them from extended to retracted positions. A plurality of knives are used to trim around a three-dimensional article.

17 Claims, 3 Drawing Sheets

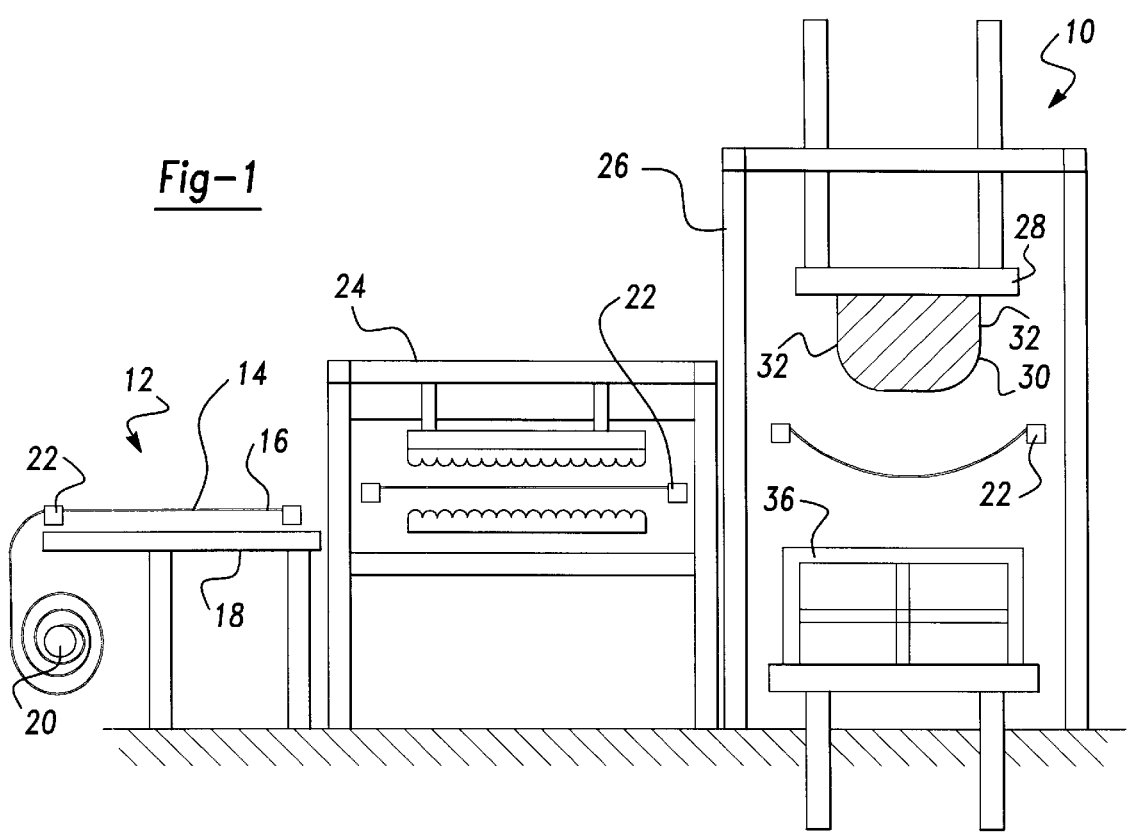
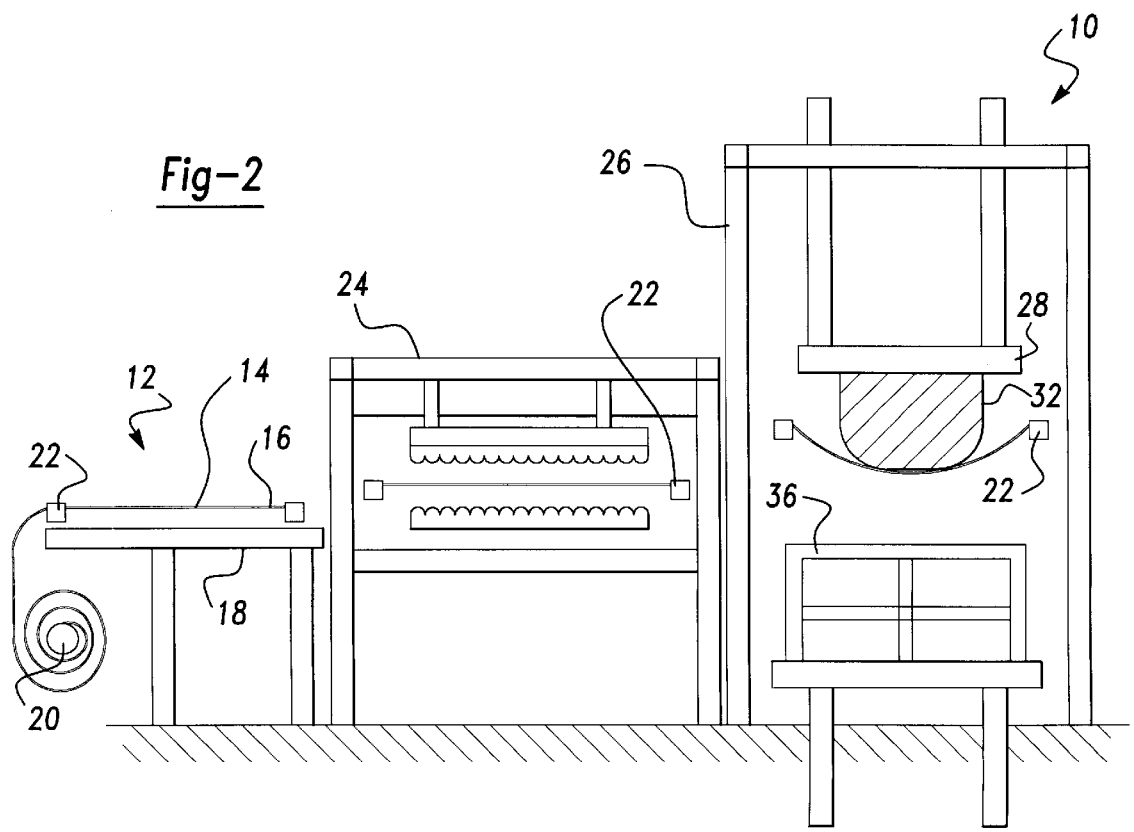

METHOD AND APPARATUS FOR TRIMMING THERMOFORMED FILMS

BACKGROUND OF THE INVENTION

1. Field of the Invention

The present invention relates to a method and apparatus for trimming a thermoformed film. More specifically, the invention relates to a method and apparatus for trimming the film in conjunction with the thermoforming operation.

2. Description of the Related Arts

It is known to manufacture molded articles by injection molding a backing to a decorative sheet. The method is described in U.S. Pat. No. 3,668,034 ('034). The '034 patent teaches placing a decorative laminate within a mold and then injection molding a polymeric material behind the laminate. The resin inlet is juxtaposed to the laminate backing. The polymeric material heats, softens and finally fuses to the backing on the laminate.

This reference does not disclose forming the film, but the illustrations are two relatively simple two-dimensional films. These films are easily positioned within a tool and molded into an article. Larger articles with three-dimensional surfaces are much more difficult to properly align within a tool. They must be precisely trimmed to the desired dimension. Because these articles are three-dimensional, it is difficult to precisely trim the article after it is molded. The films are easily trimmed while they are flat, but it is desirable to leave the films untrimmed to have excess material. The excess material is useful to retain the film during the thermoforming operation to enable the film to stretch over the mandrel. Films are normally trimmed after they have been formed.

Heretofore, in-mold film laminates have been manufactured using movable molds and stationary cores as illustrated in U.S. Pat. No. 5,514,427 ('427). The '427 patent teaches a mold press having a stationary core. The resin inlet is placed within the core and injects molten plastic material behind the film. The '427 patent does not teach how the finished molded article is removed from the press. U.S. Pat. No. 5,599,608 similarly teaches a movable core having a resin inlet injecting plastic behind the film.

U.S. Pat. No. 5,599,608 teaches a method of thermoforming a film on a mandrel and then trimming the film after it is removed from the mandrel. After the film is molded, it is trimmed. The U.S. Pat. No. 5,599,608 does not teach trimming the film while still on the forming mandrel. Removing the film from the forming mandrel requires properly locating the precise location on the film for trimming. Because the film is flexible and formed in a three-dimensional shape, locating these areas precisely is difficult and time consuming. It also requires an additional manufacturing step. It is desirable to trim the film while it is still on the forming mandrel because the precise location on the film is easily and repeatably identified. It is also desirable to combine the forming and trimming operation to take advantage of the dwell time on the mandrel while the film is cooling.

These deficiencies and problems are overcome by the present invention.

SUMMARY OF THE INVENTION

The present invention relates to a method of trimming a thermoformed film comprising the following steps. A thermoplastic flexible film is placed within a frame. The film and frame are heated sufficiently to make the film pliable. The film and frame are moved to a position adjacent a forming mandrel. The forming mandrel is moved against the film and causes the film to conform to the shape of the mandrel. After the film has fully conformed to the shape of the mandrel, the mandrel and film are moved to a trimming station. Knives on the trimming station contact and cut the film. It is also desirable for the knives to be mounted on actuators to move them from extended to retracted positions. The plurality of knives are used to trim around a three-dimensional article.

The present invention also provides an apparatus to trim an article. The apparatus includes a frame receiving a flexible film. The frame clamps the perimeter of the film. A heater heats the film sufficient to make the film pliable. The film and frame are moved adjacent a forming mandrel. The mandrel is movable between first, second and third positions. The film is placed adjacent the mandrel while the mandrel is in the first position. The mandrel is moved to a second position and contacts the film. The frame restrains the perimeter of the film and causes the film to take the shape of the mandrel. While the film is still pliable, the mandrel is moved to the third position. The film and mandrel enter a trimming station that trims the film perimeter while the film is on the mandrel.

It is desirable that the mandrel be used to locate the precise areas of the film that are cut. The trimming station includes movable knives that extend and retract to trim the film against the mandrel. In this way, the film is easily and repeatably trimmed to the desired dimension. The film finishes cooling on the mandrel and is then later removed.

The present invention enables the use of traditional molding mandrels. Because the film is retained on the mandrel, it is precisely trimmed in the same location. The invention greatly facilitates the manufacture of large complex articles that require trimming a three-dimensional film.

These and other desired objects of the present invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 1 is a perspective view of a thermoforming apparatus useful in the present invention in the raised position.

FIG. 2 is the thermoforming apparatus FIG. 1 in the forming position.

DETAILED DESCRIPTION OF THE PREFERRED EMBODIMENTS

Figure 3:
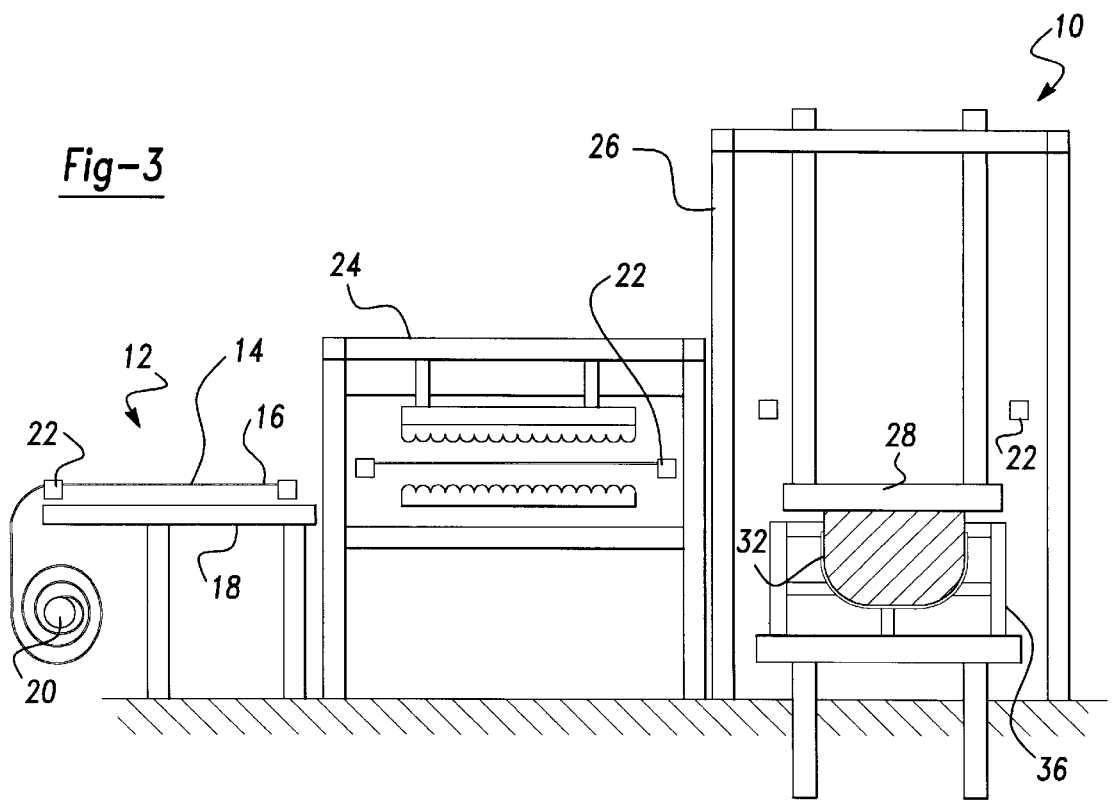
FIG. 3 is the thermoforming apparatus FIG. 1 in the trimming position.

The present invention will be described through a series of drawings, which illustrates a thermoforming and trimming operation that molds a film into shape and then trims excess material from the film. The invention will be illustrated as forming and trimming a film-preform for an automotive bumper facia. Other interior or exterior components such as instrument or door panels may be manufactured using the same or similar technique and equipment and are included within the invention described herein. The following items are a word list of items described in the drawings and are reproduced to aid in understanding the invention:

10 thermoforming and trimming apparatus
12 film loading station
14 film
16 painted surface
18 backing surface
20 unloader
22 frame
24 heating station
26 thermoforming station
28 press
30 mandrel
32 vertical surfaces of mandrel
34 vacuum passages
36 trimming station
38 knives
40 pistons
42 groove
44 edges
46 blade tip
48 polymer material FIG. 1 illustrates a perspective view of a thermoforming and trimming apparatus 10 in an open or raised position. The mold apparatus 10 comprises a film loading station 12 receiving a roll of flexible film 14. The film 14 may also be cut into sheets for thermoforming. The flexible film 14 is made from a thermoformable material. Thin films include such as Avloy™ manufactured by Avery Dennison and ISF™ manufactured by 3M/Rexam. Thicker films include polyvinyl chloride and thermoplastic urethanes. The film 14 has multi-layer construction including a painted surface 16 and a backing sheet 18. An operator (not shown) loads the film 14 onto an unloader 20. The unloader 20 unrolls the film 14 into a relatively flat sheet. The flat sheet is placed within a frame 22. The frame 22 holds the film 14 by two or more sides. The frame 22 and film 14 are placed within a heating station 24. The heating station 24 warms the film 14 to a temperature sufficient to make it pliable. After the film 14 is heated, it is moved to a thermoforming station 26.

The thermoforming station 26 includes a vertically mounted thermoforming press 28. A vertically moveable press 28 enables it to be moved from a fully open position as illustrated in FIG. 1 to a thermoforming position as illustrated in FIG. 2 and to a trimming position as illustrated in FIG. 3. The press 28 includes a thermoforming mandrel 30. The mandrel 30 is formed in the shape of the desired film pre-form. It is made from tool steel or aluminum, but other materials may be used. As will be described in more detail below, the mandrel 30 includes vacuum passages 34 to draw the film 14 against the mandrel surface. The mandrel may also include heating and cooling passages (not shown) to heat and cool the film 14. The frame 22 and the film 14 are placed adjacent the mandrel 30. The film 14 is sufficiently large so as to completely cover the mandrel 30.

Figure 5:
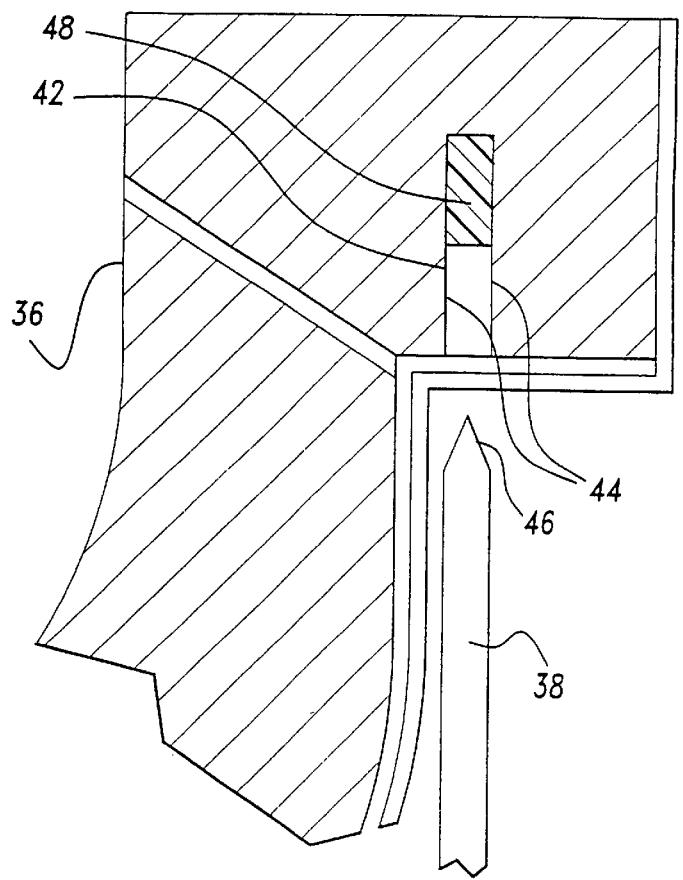
FIG. 5 is a detailed cross-sectional view of a knife in a retracted position.

The apparatus 10 allows for the continuous loading, heating, forming and trimming of the film 14, because each operation is performed in a different station. After the frame 22 and film 14 are placed adjacent the mandrel 30, the moveable press is moved to the thermoforming position as illustrated in FIG. 2. The mandrel 30 contacts the film backing surface 18 and causes the film 14 to conform to the shape of the mandrel 30. The frame 22 retains the edges of the film 14 and allows the mandrel 30 to pass through. Because the film 14 is pliable it stretches to closely conform to the shape of the mandrel 30. When forming three-dimensional articles like automotive facias, the film 14 must wrap around the vertical surfaces 32 of the mandrel 30. As illustrated in FIG. 5, vacuum passages 34 draw the film 14 tightly against the mandrel 30.

After the film 14 is formed to the shape of the mandrel 30, the frame 22 is removed and the mandrel 30 and film 14 are moved to the trimming station 36 as illustrated in FIG. 3. The trimming station 36 may be under the mandrel 30 as shown, or alternatively may be placed above to next to the mandrel 30. The trimming station 36 includes a plurality of movable knives 38 that moved from a retracted to an extended position. As will be more fully described below, the knives contact the film 14 and precisely trim the film 14 while it is still on the mandrel 30.

Figure 4:
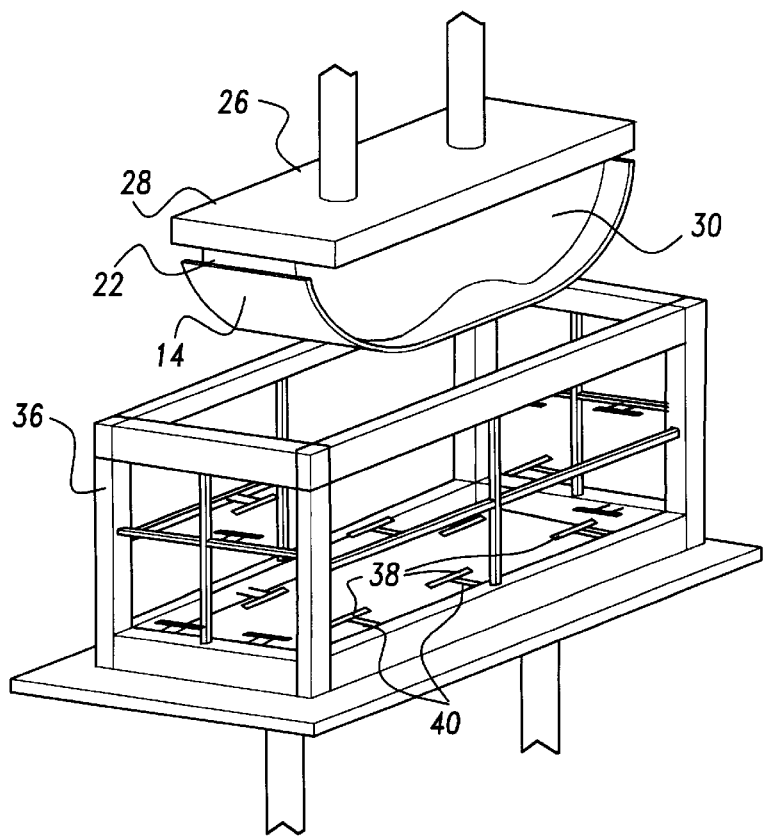
FIG. 4 is an enlarged perspective view of the trimming station.

The trimming knives 38 are shown in greater detail in FIGS. 4 and 5. Illustrated in FIG. 4 is a perspective view of the trimming station 36 having a plurality of knives 38. Multiple knives 38 are needed to reach the periphery of a three-dimensional film-preform. The shape and complexity of the preform determine the number and arrangement of knives 38. The knives 38 are mounted on extendable pistons 40. The pistons 40 may be pneumatically or hydraulically driven to move the knives 38 between retracted and extended positions. Alternatively, motors, solenoids or other means, may move the knives 38.

Figure 6:
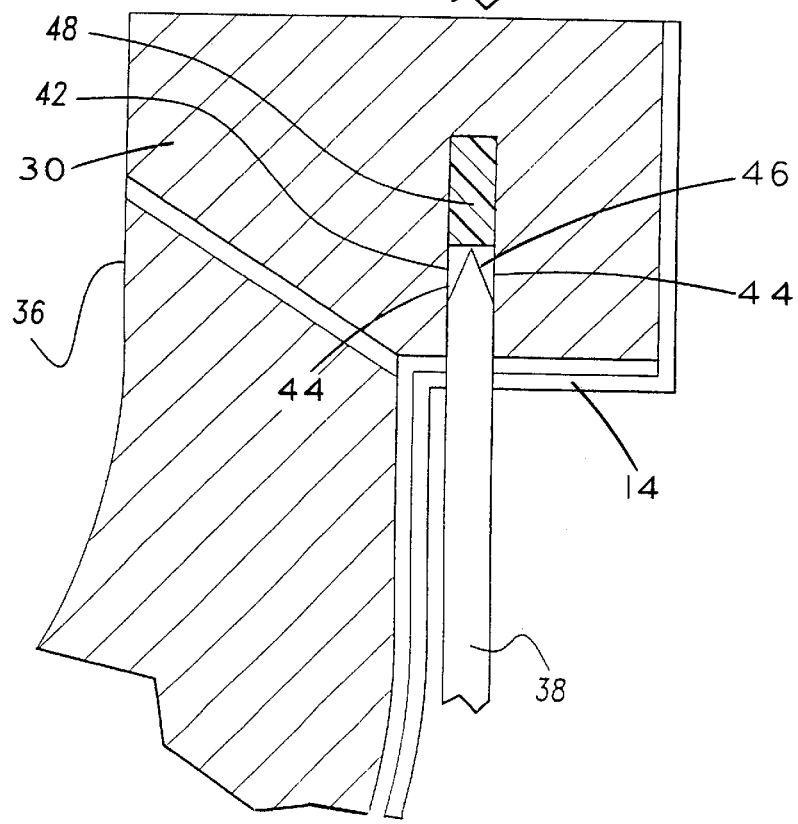
FIG. 6 is a detailed cross-sectional view of a knife in an extended position trimming the film.

The mandrel 30 is precisely positioned with the trimming station 36 by locators (not shown) that repeatably position the mandrel 30 in the desired location for trimming. The knives 38 are in a retracted position to accept the mandrel 30. After the mandrel 30 is in the trimming station 36, the knives 38 are moved from a retracted position to an extended position as shown in FIGS. 5 and 6.

The mandrel 30 includes a plurality of grooves 42. Each groove 42 mates with a corresponding knife 38. The groove 42 includes edges 44 that provide a shearing surface to cut the film 14. The knife includes a blade tip 46 that contact the film 14. As the knife is moved to the fully extended position as illustrated in FIG. 6, the blade tip 46 and the edges 44 cut the film 14.

In some instances, it may be desirable to include a polymer material 48 in the bottom of the grooves 42 to provide a surface to cut against.

In some circumstances, the orientation of the knives 38 would cause interference if each knife were actuated at the same time. In this instance, different knives are extended at different times to avoid this interference. The entire perimeter of the film preform may usually be trimmed in two cutting cycles by alternating extending and retracting adjacent knives.

Because the knives cut the film 14 while it is still on the mandrel 30, the film 14 is always trimmed in the precise and repeatable location. By using a controller (not shown) to control the operation of the mandrel 30 and pistons 40, the film 14 may be trimmed at approximately the same time as removal from the heating station 24. This reduces variability due to the film shrinkage. The grooves 42 locate the precise location on the film 14 for the cutting operation.

The invention allows the film 14 to be trimmed while it is still undergoing cooling on the mandrel 30. The film must remain on the mandrel 30 a fixed amount of time to retain a permanent shape. The cooling time was previously not utilized. By combining the trimming and cooling in one operation, the dwell time of the film 14 on the mandrel for cooling is also used for trimming. The invention also has the advantage that the manufacturing step of separately trimming the film is eliminated. The invention has the dual advantage of reducing manufacturing costs and complexity by the forming and trimming operation in one tool. It also greatly increases the accuracy and precision of the film trimming. This is especially critical for large, three-dimensional film preforms that must register with features in a subsequent molding operation.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims.

What is claimed:

1. A method of thermoforming a film and trimming the thermoformed film comprising the steps of:

heating a thermoplastic flexible film to make said film pliable; then moving said heated, pliable film adjacent to a forming mandrel having a three-dimensional shape; then forming said heated, pliable film into the three-dimensional shape by moving said mandrel against said film to cause said film to conform to the shape of said mandrel, said film being unsupported on a side of said film opposite said mandrel during said forming step; then moving said three-dimensional formed film on said mandrel into a trimming station having trimming means; and then trimming excess material from said three-dimensional formed film while said film is on said mandrel by urging said film against said mandrel with said trimming means.

2. The method of claim 1, wherein said film is caused to be drawn against an outer surface of said mandrel during said forming step.

3. The method of claim 2, wherein said film is drawn against said outer surface of said mandrel with a vacuum.

4. The method of claim 2, wherein said forming step is conducted in a forming station and said trimming step is conducted in a trimming station which is different from and separated from said forming station.

5. The method of claim 2, wherein said trimming step is conducted by urging said film against said mandrel with a plurality of movable knives which move between extended and retracted positions, said knives trimming said film while in said extended position.

6. The method of claim 5, wherein adjacent ones of said knives alternately move between said extended and retracted positions to avoid interference between said knives.

7. A method of thermoforming a film and trimming the thermoformed film comprising the steps of:

heating a thermoplastic flexible film to make said film pliable; then moving said heated, pliable film adjacent to a forming mandrel in a forming station, the forming mandrel having a three-dimensional shape; then forming said heated, pliable film into the three-dimensional shape by moving said mandrel against said film to cause said film to conform to the shape of said mandrel, said film being unsupported on a side of said film opposite said mandrel during said forming step; then moving said three-dimensional formed film on said mandrel into a trimming station which is different from and separated from said forming station, said trimming station having trimming means; and then trimming excess material from said three-dimensional formed film with said trimming means while said film is on said mandrel.

8. The method of claim 7, wherein said step of moving said mandrel and said film into said trimming station comprises moving said mandrel and said film into a trimming station which is spaced a distance below said forming station.

9. The method of claim 7, wherein said step of moving said mandrel and said film into said trimming station comprises moving said mandrel and said film into a trimming station which is spaced a distance to the side of said forming station.

10. The method of claim 7, wherein during said film is caused to be drawn against an outer surface of said mandrel during said forming step.

11. The method of claim 10, wherein said film is drawn against said outer surface of said mandrel with a vacuum.

12. An apparatus for thermoforming a film and trimming the thermoformed film comprising:

a frame holding a thermoplastic flexible film, said film having a perimeter;

a heater heating said film to make said film pliable;

a forming mandrel having a three-dimensional shape, said forming mandrel being movable between first, second and third positions, said frame and said heated, pliable film being placed adjacent said mandrel while in said first position, and said mandrel forming said heated, pliable film into the three-dimensional shape by contacting said heated, pliable film in said second position to cause said film to conform to the shape of said mandrel, said film being unsupported on a side of said film opposite said mandrel during said forming step; and a trimming station positioned adjacent said mandrel, said trimming station having trimming means which contacts said mandrel in said third position to trim excess material from said film perimeter by urging said film against said mandrel.

13. The apparatus of claim 12, wherein said mandrel is positioned in a forming station, and said trimming station is different from and separated from said forming station.

14. The apparatus of claim 13, wherein said trimming station is positioned a distance below said forming station.

15. The apparatus of claim 12, wherein said mandrel includes vacuum means to draw said film against an outer surface of said mandrel.

16. The apparatus of claim 12, wherein said trimming means comprises a plurality of movable knives which move between extended and retracted positions, said knives trimming said film while in said extended position.

17. The apparatus of claim 16, wherein adjacent ones of said knives alternately move between said extended and retracted positions to avoid interference between said knives.

* * * * *